Figure 1:
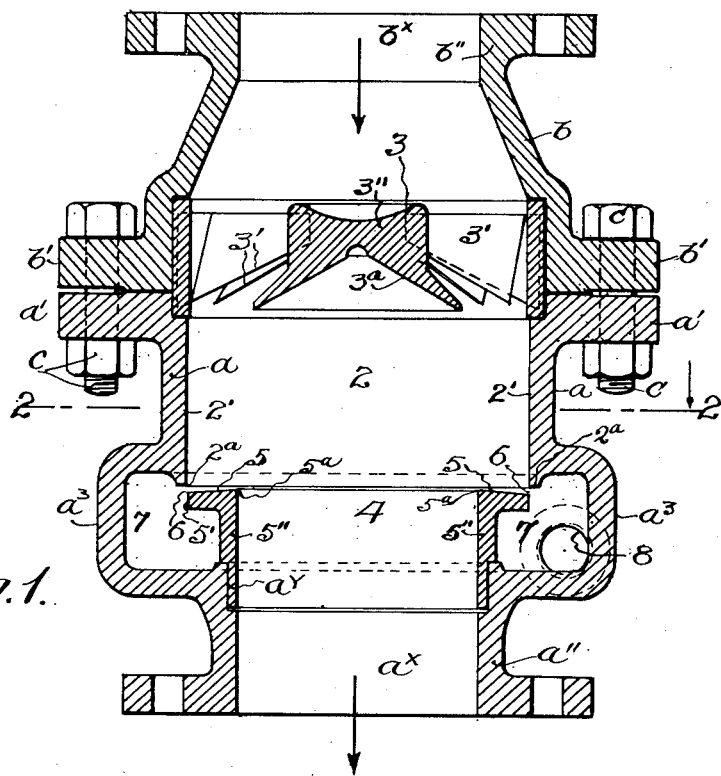

Oct. 17, 1933.    C. G. HAWLEY    1,931,193
CENTRIFUGAL SEPARATOR
Filed March 8, 1932    2 Sheets-Sheet 1

INVENTOR
Charles G. Hawley.
BY Mason & Mason
ATTORNEYS

Oct. 17, 1933.   C. G. HAWLEY   1,931,193
CENTRIFUGAL SEPARATOR
Filed March 8, 1932   2 Sheets-Sheet 2

INVENTOR
Charles G. Hawley.
BY Mason & Mason
ATTORNEYS

Patented Oct. 17, 1933

1,931,193

UNITED STATES PATENT OFFICE 1,931,193

CENTRIFUGAL SEPARATOR

Charles Gilbert Hawley, Chicago, Ill., assignor to Centrifix Corporation, Cleveland, Ohio, a corporation of Ohio Application March 8, 1932. Serial No. 597,559

3 Claims. (Cl. 183—80)

This application is companion to my earlier applications S. N. 236,519, S. N. 337,596, S. N. 337,597 and has to do with certain improvements on the subject matters thereof.

The invention relates to the art of centrifugally separating various substances from carrier fluids that are in motion. The work is done by the rotation of the fluid but is accomplished within a so-called separator which is fixed against rotation and contains no rotating parts. Instead the separator includes a so-called whirl promoting tuyère the presence of which results in imparting vortexial or whirling movement to the fluid that passes through the body of the separator. Such movement in turn results in the centrifugal separation of the foreign substances or impurities carried by the moving fluid and finally the impurities in one way or another are removed from the separator in advance of the fluid outlet thereof.

This present invention has particular reference to improvements in the construction relied upon to permit and accomplish the collection and removal of the centrifugally separated substances.

High efficiency, high capacity and low original and maintenance costs are all demanded of such separators. They are also required to be efficient throughout a great range of working velocities and to be practical they must be self-cleaning. Such separators are of little greater size than the pipes on carrier conduits wherein they are included and yet are required to be dependable in all respects.

The object of the present invention is to provide a centrifugal separator which shall meet the demands next above recited.

Specifically, the objects of the invention are to provide a separator that shall be adapted for direct inclusion in a carrier line or pipe; that shall oppose little resistance to the passage of the carrier fluid; which shall comprise a minimum number of parts and all of simple construction; which shall comprise only fixed or stationary parts and be free from rotating parts; which shall be effective to remove substantially all centrifugally separable substances from the fluid and to discharge the same from the line; which shall be of small size, weight and cost as compared to other separators of like capacities and efficiencies; which shall be durable and strong; which shall be transportable and installable as a single unit; which shall be substantially self-cleaning; and, adapted for easy dismemberment, and removal from the line. Other objects of the invention will appear hereinafter.

With these objects in view, the invention comprises a centrifugal separator of the construction, combination and arrangement of parts hereinafter detailed and exemplified in the drawings that form part of this specification.

Figure 2:
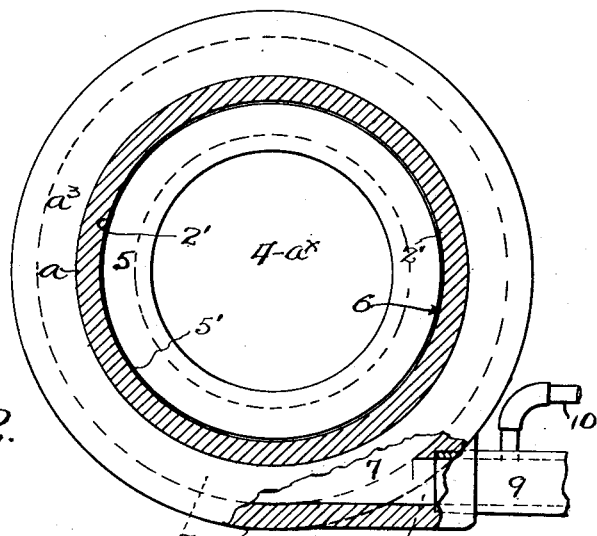
Figure 3:
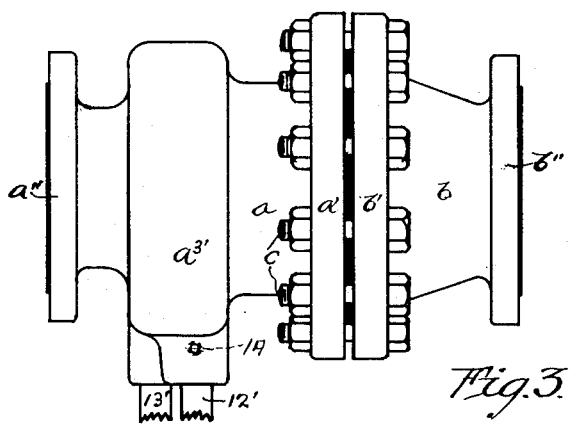
Figure 6:
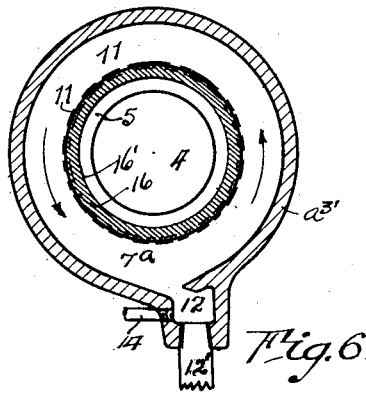
Figure 4:
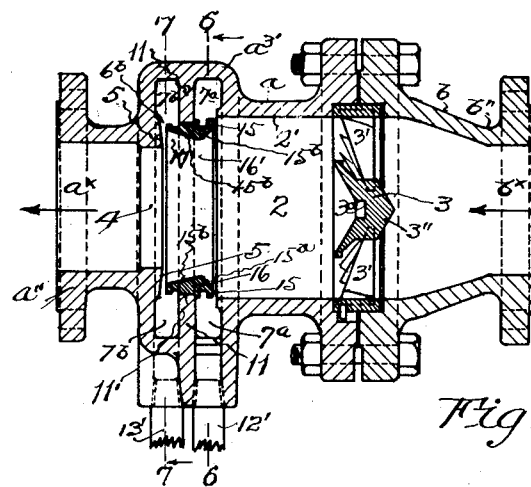
Figure 7:
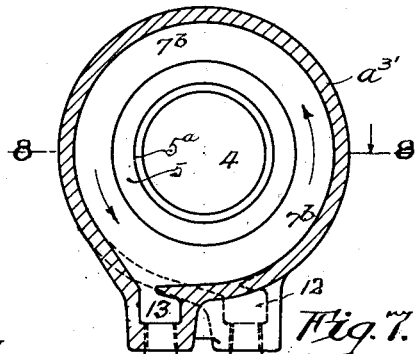
Figure 5:
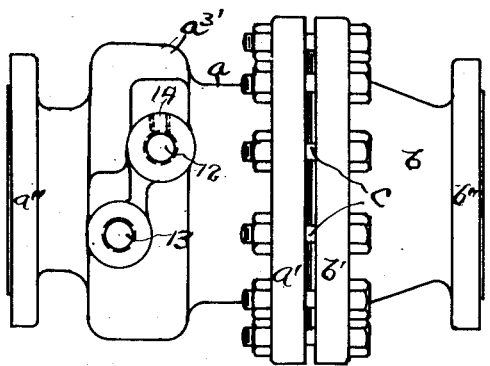
Figure 8:
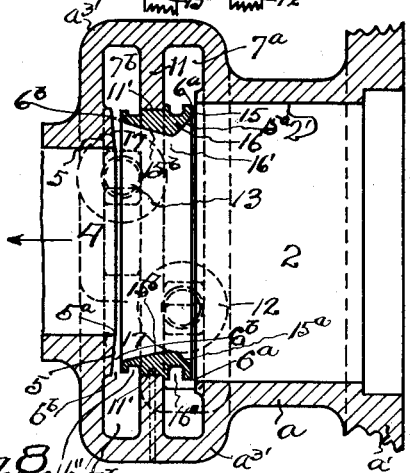

In said drawings Fig. 1 is a longitudinal section of a separator embodying this invention;— Fig. 2 is a cross section thereof on the line 2—2 of Fig. 1;—Fig. 3 is a side elevation of a like separator but of the duplex eject type;—Fig. 4 is a vertical section of the latter;—Fig. 5 is a view of the separator from beneath;—Fig. 6 is a cross-section on the line 6—6 of Fig. 4;—Fig. 7 is a cross section on the line 7—7 of Fig. 4;—and, Fig. 8 is an enlarged horizontal section, as upon the line 8—8 of Fig. 7, more clearly illustrating the fixtures typifying this particular invention as embodied in a separator of the kind shown in Fig. 3.

On reference to the drawings it will be seen that a separator of the kind embodying this invention is typified by a cylindrical separating chamber 2 having at one end a whirl promoting tuyère 3 and at the other containing a smaller outlet orifice 4. To exemplify the present invention without limiting it to a particular construction, separators of two kinds have been shown, that of Figs. 1 and 2 being of the single eject type whereas the separator of Figs. 3, 4 and 5 is of the duplex eject type. The invention is embodyable in separators of still other kinds as will become clearly apparent to those who are skilled in the art, and as implied by the scope of the appended claims.

As represented in Figs. 1 and 2, the tuyère 3, the separating chamber 2 and the outlet 4 are contained by a generally cylindrical casing having thick walls and adapted for inclusion in a pipe line. The casing of this particular separator is made in two parts. The larger part $a$, is called the body of the separator while the part $b$ is called the inlet bell. Those parts have flanges $a'$ and $b'$ and are tightly fastened together by bolts $c$. They are formed to accommodate the tuyère 3 and together the parts $a$ and $b$ serve to hold that tuyère in place and against rotation. The ends $a''$ and $b''$ of the casing are shaped and finished for easy inclusion in a carrier pipe of a size which corresponds with the diameters of the openings $a^x$ and $b^x$ in the ends of the casing.

The whirl promoting tuyère 3 is of the so-called radial type which presents to the entering fluid a circumferential series of inclined deflecting blades 3' and a central hub 3''. By preference the tuyère also presents the so-called vortex defeating cone portion 3a, which latter opens toward the orifice 4 and is coaxial therewith. The construction of the tuyère here shown is fully described and claimed in my companion application S. N. 597,558, of even date herewith and does not require detailed description in this case. The presence of the tuyère 3 at the intake of the separating chamber 2 causes the passing fluid to whirl within the chamber with a degree of vigor proportioned to the velocity of fluid movement and the angularity of the tuyère blades 3'.

The separating or vortex chamber has a longitudinally extended cylindrical wall 2' and obviously serves to confine the fluid vortex to that diameter while permitting the spiral movement of the fluid toward the orifice 4. As shown, the diameter of the orifice 4 is less than that of the chamber 2 and the whirling movement of the fluid toward and into the orifice is governed by the presence of an annular end or abutment portion 5 which is interposed between the wall 2' and the margin of the orifice 4. The centrifugally separated substances which gather upon the wall 2' are urged toward the abutment 5 by the longitudinal movement of the fluid and are centrifugally discharged through a narrow circumferential slot 6 that is provided between the end of the wall 2' and the annular end portion 5. The wall 2 terminates in a circumferential end portion 2a formed in a plane which is perpendicular to the axis of the chamber. That shoulder 2a marks one margin of a wide circumferential groove 7 which is formed within the casing, near the outlet end thereof.

A circumferential bulging portion $a^3$ of the casing contains the relatively deep groove 7 and a preferably tangential drain opening 8. The latter may be positioned in the groove as shown by full line in Fig. 1, that position being correct for separators which are used in the downgoing position illustrated and also for such thereof as are used in horizontal positions. When the separator is to be used in inverted or upgoing position, the drain opening should be made at the other side of the groove.

The drain opening is continued in a pipe 9 which leads to a suitable discharge trap (not shown). The pipe 10 of Fig. 2 represents the approximate point of connecting the return vent pipe belonging to such trap.

It is to be noted that the construction thus far described is characterized by the flange $a'$ of the body of the casing and by a bulging portion $a^3$ which is longitudinally spaced therefrom. The construction is advantageous in that it permits the clamping together of the casing parts by means of the short bolts and nuts c, after the manner disclosed in my earlier application S. N. 337,596 and yet the present separator retains the advantages of a capacious circumferential space after the manner of my application S. N. 337,597.

The groove 7 is called a separating race. It is a circumferential cavity or space in which the collected substances are gathered and prepared for discharge through the drain 8.

The use of the wide, deep groove 7 in the casing is advantageous from all standpoints relating to the casting of the casing in the foundry, and because ample space is thereby afforded for the reception, the gathering and the temporary holding of the centrifugally separated substances. At the same time it is to be noted that communication between the separating chamber 2 and the race 7 is here limited to and by the narrow slot 6.

Clearly, the fluid pressure within the separating chamber 2 is greatest at the juncture of the cylindrical wall 2 and the annular abutment 5 and it is of special advantage that the construction here defined permits communication between the separating chamber and the race to be limited to a slot 6, which though amply wide to permit the escaping passage of the separated substances, prevents violent movement and interchange of carrier fluid within the race. Such movement if permitted would result in a considerable re-entrainment of the separated matters.

The purpose of this invention is to virtually prevent or block the movement of the fluid into and out of the race while permitting the free centrifugal discharge of the separated substances into the race. These purposes are made possible and are attained in the separate ring-like element which closes the greater part of the groove or race from within, thus limiting communication to the narrow slot 6. The ring-like race closure or limiting element is combined with the annular abutment portion of the separating chamber as required to complete the limited slot 6.

As shown in Fig. 1, the race closure comprises the portions 5 and 5'', the latter containing the central orifice 4. The largest diameter of the abutment portion 5 is marked by its periphery 5' and is slightly less than the diameter of the cylindrical chamber 2; permitting the ring-like element to be installed at the casing. It is fastened in the outlet end of the casing, one end of the sleeve portion 5'' being accommodated in a recess $a^y$ which it fits tightly to prevent leakage from the race 7 into the outlet $a^x$ of the separator.

The annular abutment 5 at the end of the separating chamber is best made of conical form so that the surface 5 is slightly inclined away from the orifice 4 and toward the circumferential discharge slot leading into the race. The conical surface 5 beginning at the inner margin 5a has the effect of improving the outward thrust of the whirling carrier fluid upon any heavier substances that may be deposited upon the abutment surface 5, thus better ensuring the discharge thereof into the encircling race 7. The above mentioned marginal portion 5a is commonly termed a pressure effecting lip.

The separator of Fig. 1 is peculiarly suited for the centrifugal purification of carrier fluids which contain foreign substances of substantially uniform grade or quality and hence capable of concentration and discharge through a single eject slot 6. In cases involving carrier fluids that contain foreign substances of different sizes and qualities the heavier substances tend to be discharged through the circumferential eject slot while the lighter substances are prevented from reaching the cylindrical wall 2' and are carried away through the outlet of the separator. In such cases it is best to duplicate the means of separation in the manner which is shown in Figs. 3 to 8 and thereby a separator embodying this present invention is made to possess the advantages of the separators described and claimed in my companion applications S. N. 337,596 and S. N. 337,597 before referred to.

Turning to Figs. 4 and 8, it will be seen that the circumferential bulging portion $a3'$ of that separator contains, not one but two circumferential grooves $7a$ and $7b$ which are separated by a partition 11. The latter contains a central 11' which is coaxial with and of less diameter than the chamber 2 but of greater diameter than the outlet orifice 4. It will be again referred to.

The grooves or races 7a and 7b are provided with separate tangential eject openings or drains 12 and 13, respectively. These are best shown in Figs. 6 and 7 and the conveniently staggered relation thereof is best disclosed by Figs. 5 and 8. They have respective eject pipes 12' and 13', suitably leading to a discharge trap (not shown). The vent 14 of such trap re-enters the eject passage 12 of the higher pressure race. It may be explained that the pressure attained in the race 7a slightly exceeds that in the second race 7b.

The now familiar annular abutment portion 5 and its pressure effecting lip, in this case, is associated with the groove or race 7b, adjacent the central outlet orifice 4 and becomes a secondary separating surface. A primary or preliminary annular abutment surface 15, is provided by a race-closure ring 16 that is tightly fitted to the before mentioned central bore 11' in the partition 11. That ring is nearly as wide as the two grooves 7a and 7b, taken together. By means of this ring two narrow eject slots 6a and 6b are formed, the same leading into the grooves 7a and 7b respectively and each performing in the manner above described with respect to the slot 6 of Fig. 1.

The largest diameter of the ring 16 is slightly less than that of the chamber 2 and the ring is inserted and installed through that opening as before described with respect to the ring 5—5''. The smallest internal diameter of the ring 16 marks an opening 16' that is coaxial with but of greater diameter than the outlet orifice 4.

To secure the advantages of a Venturi outlet the interior of the ring 16 is made to comprise the intersecting conical surfaces 15a and 15b. The former merges with the abutment surface 15 and being pitched inwardly and toward the outlet 4 provides for the easy relief of the whirling fluid from the abutment surface 15.

The conical surface 15b pitches outward and in association with the surface 5 converts the lower part of the ring into a shallow collecting race 17 which leads toward and terminates in the second eject slot 6b.

External grooves 16'', provided in the ring 16, assist in retaining substances that enter the races through respective slots 6a, 6b.

The fluid which rotates within the chamber 2 approaches the abutment surfaces 5 and 15 spirally, carrying the foreign substance forward in like manner. The presence of the abutment surfaces tends to shorten the pitch of the spirals thus accentuating the whirling motion of the centrifugally separated solids or liquids and affording time for the separation thereof to take place.

The major ejection of foreign substances occurs when the first circumferential slot is reached. The lesser substances impact the ring 16 and whirl forward or across the same toward the outlet 4. Meantime the centrifugal forces remain effective and such stray quantities are advantageously collected in the inner race 17 and are centrifugally discharged through the second slot 6b and into the second race or collected groove 7b. Meantime, the purified fluid passes onward and out through the orifice 4.

Those who are skilled in the art will at once perceive that all of the objects just recited herein are attained in the very compact and economical separators herein described.

Having thus described my invention I claim as new and desire to secure by Letters Patent:—

1. A separator of the fixed centrifugal type comprising a separator body that contains an open centrifugal separating chamber and at the end of said chamber a circumferential race or groove which is of greater diameter, said race having an eject drain and said body having a central outlet adjacent said race and coaxial with but of less diameter than said chamber, in combination with whirl promoting means that form the fluid inlet of said open centrifugal chamber, and, a ring-like race closure insertable through said chamber and having its inner end separated from the end of said chamber by a narrow circumferential slot, opening into said race said ring otherwise covering or closing said race from within and with said end of the chamber completing said narrow circumferential eject slot and thus providing limited radial communication between said chamber and said race.

2. A separator of the fixed centrifugal type comprising a separator body that contains an open centrifugal separating chamber and at the end of said chamber successive circumferential races or grooves of greater diameter, each said race having an eject drain and said body having a central outlet adjacent the last of said races and coaxial with but of less diameter than said chamber, in combination with whirl promoting means that form the fluid inlet of said chamber, and, a longitudinally extended ring-like race closure barely insertable through said chamber and having its inner end slightly spaced from the said end of the latter and having its outer end slightly spaced from said central outlet, said ring otherwise covering or closing both said races from within and completing narrow circumferential eject slots in radial communication with respective races.

3. A separator of the fixed centrifugal type comprising a separator body that contains an open centrifugal separating chamber and at the end of said chamber containing successive circumferential races of greater diameter than said chamber, each said race having an eject drain and said body having a central outlet adjacent the second of said races coaxial with but of less diameter than said chamber, in combination with whirl promoting means that form the fluid inlet of said chamber, and, a ring-like race closure barely insertable through said chamber and having its ends spaced from adjacent respectively opposite margins of said races and thus completing narrow circumferential eject slots in radially open communication with respective races, and, the interior of said ring being of Venturi shape and of greater diameter than said outlet.

CHARLES GILBERT HAWLEY.